US007620566B2

(12) United States Patent
Tenorio

(10) Patent No.: US 7,620,566 B2
(45) Date of Patent: Nov. 17, 2009

(54) PROVIDING DECISION SUPPORT THROUGH VISUALIZATION OF PARTICIPANT PAST PERFORMANCE IN AN ELECTRONIC COMMERCE ENVIRONMENT

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1985 days.

(21) Appl. No.: 09/978,926

(22) Filed: Oct. 16, 2001

(65) Prior Publication Data

US 2004/0172322 A1 Sep. 2, 2004

(51) Int. Cl.
*G06Q 90/00* (2006.01)

(52) U.S. Cl. ........ 705/11

(58) Field of Classification Search ........ 705/11
See application file for complete search history.

(56) References Cited

U.S. PATENT DOCUMENTS

| | | | | |
|---|---|---|---|---|
| 5,627,973 | A * | 5/1997 | Armstrong et al. | 705/10 |
| 5,734,890 | A * | 3/1998 | Case et al. | 707/5 |
| 5,765,138 | A * | 6/1998 | Aycock et al. | 705/7 |
| 5,926,794 | A * | 7/1999 | Fethe | 705/11 |
| 5,950,172 | A * | 9/1999 | Klingman | 705/26 |
| 5,999,908 | A * | 12/1999 | Abelow | 705/1 |
| 6,131,087 | A * | 10/2000 | Luke et al. | 705/26 |
| 6,151,582 | A * | 11/2000 | Huang et al. | 705/8 |
| 6,260,019 | B1 * | 7/2001 | Courts | 705/1 |
| 6,539,392 | B1 * | 3/2003 | Rebane | 707/101 |
| 6,647,374 | B2 * | 11/2003 | Kansal | 705/37 |

(Continued)

FOREIGN PATENT DOCUMENTS

| | | |
|---|---|---|
| CN | 331612 | 5/1998 |

(Continued)

OTHER PUBLICATIONS

Thompson, Kenneth. "Vendor Profile Analysis," Journal of Purchasing and Materials Management, Winter 1990 [retrieved from Proquest].*

(Continued)

*Primary Examiner*—Beth V Boswell
*Assistant Examiner*—Neil R Kardos
(74) *Attorney, Agent, or Firm*—Booth Udall, PLC; Steven J. Laureanti

(57) ABSTRACT

A method for providing decision support through visualization of participant past performance is performed using a computer system associated with an electronic marketplace. The method includes retrieving stored past performance information for participants reflecting the performance of the participants in connection with prior transactions conducted using the marketplace. Substantially linear viewable objects are generated for display to a user, each object corresponding to a participant and including one or more subdivisions, each defined by first and second subdivision boundaries. Each subdivision corresponds to a past performance measure and has a length that is proportional to a value of the measure determined according to the past performance information for the participant corresponding to the object. User input selecting a particular measure is received and the first boundaries of the subdivisions corresponding to the selected past performance measure are aligned such that past performance of the participants with respect to the selected measure can be readily visually compared in connection with a marketplace decision.

26 Claims, 1 Drawing Sheet

U.S. PATENT DOCUMENTS

| | | | | |
|---|---|---|---|---|
| 6,839,690 | B1 * | 1/2005 | Foth et al. | 705/53 |
| 6,871,181 | B2 * | 3/2005 | Kansal | 705/4 |
| 2002/0099579 | A1 * | 7/2002 | Stowell et al. | 705/7 |
| 2003/0005108 | A1 * | 1/2003 | Bartley et al. | 709/224 |
| 2003/0023499 | A1 * | 1/2003 | Das et al. | 705/26 |

FOREIGN PATENT DOCUMENTS

| | | |
|---|---|---|
| CN | 360523 | 6/1999 |
| CN | 381239 | 2/2000 |

OTHER PUBLICATIONS

Monczka et al. "Cost-Based Supplier Performance Evaluation," Journal of Purchasing and Materials Management, Spring 1998 [retrieved from Proquest].*
Min, Hokey. "International Supplier Selection: A Multi-attribute Utility Approach," International Journal of Physical Distribution & Logistics Management, 1993 [retrieved from Proquest].*
Smytka, Daniel. "Total cost supplier selection model: A case study," International Journal of Purchasing & Materials Management, 1993 [retrieved from Proquest].*
New et al. "Developing effective customer-supplier relationships: more than one way to skin a cat," International Journal of Quality & Reliability Management, 1998 [retrieved from Proquest].*
Weber, Charles. "A decision support system using multicriteria techniques for vendor selection," The Ohio State University, 1991 [retrieved from Proquest].*
Petroni et al. "Vendor selection using principal component analysis," Journal of Supply Chain Management, 2000 [retrieved from Proquest].*
Bernard, Paul. "Managing Vendor Performance," Production and Inventory Management Journal, 1989 [retrieved from Proquest].*
@The Moment: The Platform for Real-Time Trading; "How Quickly Can You Respond to Your Markets?" pp. 1, 2001.
@The Moment Solutions; "Dynamic Trading for a Dynamic World" pp. 1, 2001.
Trade@The Moment: The Platform for Real-Time Trading; pp. 1-2, 2001.
@The Moment Real-Time Trading Applications; pp. 1-2, 2001.
@The Moment Professional Services; pp. 1, 2001.
@The Moment Trade @The Moment FAQ; "Frequently Asked Questions (FAQ) About Dynamic Trading" pp. 1-9, 2001.
Trade{fourth root}The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Auction Page; pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers; pp. 1, 2001.
@TheMoment Reliant Energy Customer Story, "Reliant Energy Turns to @TheMoment to Provide First ERCOT Auction for Electricity Generation Capacity.;" pp. 1-2.
@TheMoment White Papers; pp. 1, 2001.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; "Reducing Inventory Risks in High-Tech Component Manufacturing with Forward Contracts;" pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet; "The Complete Trading Solution for LDCs;" pp. 1-4, Oct. 2001.
Trade@TheMoment:Power Data Sheet; "The Complete Trading Solution for Electric Utilities;" pp. 1-2, Nov. 2001.
ROC Patent Application No. 86101847, entitled "Database Systems Having Single-Association Structures and Method for Searching Data in the Database Systems" 33 pages.
ROC Patent Application No. 88102070, entitled "Method and Apparatus for Creating a Distributed Electronic Commerce System" 30 pages.
ROC Patent Application No. 85105877, 257 pages.
First Office Action, ROC Patent Application No. 91123731, Jan. 2, 2004, 2 pp.

* cited by examiner 10
14
SUPPLIER
14
SUPPLIER
14
SUPPLIER
ELECTRONIC MARKETPLACE 16
BUYER
12
BUYER
12
BUYER
12

100

SUPPLIER 14a
102a
102b
102c
102d
QUOTATION
ORDER
FULFILLMENT
REPLACEMENT
102
SUPPLIER 14b
104a
104b
104c
104d
Q
O
F
R
104
SUPPLIER 14c
106a
106b
106c
106d
106
Q
O
F
R
108
t
AUGUST
SEPTEMBER
OCTOBER

100

SUPPLIER 14a
102a
102b
110
102c
102d
QUOTATION
ORDER
FULFILLMENT
REPLACEMENT
102
SUPPLIER 14b
104a
104b
104c
104d
104
Q
O
F
R
SUPPLIER 14c
106a
106b
106c
106d
106
Q
O
F
R
108
t

PROVIDING DECISION SUPPORT THROUGH VISUALIZATION OF PARTICIPANT PAST PERFORMANCE IN AN ELECTRONIC COMMERCE ENVIRONMENT

TECHNICAL FIELD OF THE INVENTION

The present invention relates in general to electronic commerce and, in particular, to providing decision support through visualization of participant past performance in an electronic commerce environment.

BACKGROUND OF THE INVENTION

Enterprises must regularly collaborate to carry out their operations. For example, enterprises may collaborate with respect to sourcing, design, production, and any other suitable activities. Despite the collaboration needs of enterprises and the sophistication of many electronic marketplace processes, previous techniques have been inadequate for many needs. For example, even if an enterprise knows the identities of other enterprises with which the enterprise may collaborate as to sourcing, design, production, or other activity, the enterprise may have no effective way of determining whether and to what extent another enterprise can be relied on as to the activity, has expertise and experience as to the activity, or otherwise can be expected to perform as to the activity. Although previous electronic marketplaces have provided limited buyer behavior analyses (e.g., buyer usually purchases nonfiction books) or simple supplier scorecarding (e.g., supplier has a three star rating), previous techniques have been inadequate to meet the needs of many more sophisticated marketplace participants.

SUMMARY OF THE INVENTION

According to the present invention, problems and disadvantages associated with previous electronic commerce techniques can be reduced or eliminated.

According to one example embodiment of the present invention, a method for providing decision support through visualization of participant past performance is performed using a computer system associated with an electronic marketplace. The method includes retrieving stored past performance information for a plurality of participants reflecting the performance of the participants in connection with one or more prior transactions conducted using the marketplace. The method also includes generating a plurality of substantially linear viewable objects for display to a user, each viewable object corresponding to a particular participant and including one or more subdivisions each defined by first and second subdivision boundaries. Each subdivision in a viewable object corresponds to a past performance measure, and has a length that is proportional to a value of the past performance measure determined according to the retrieved past performance information for the particular participant corresponding to the viewable object. The method further includes receiving user input selecting a particular past performance measure and, in response, aligning the first boundaries of the subdivisions corresponding to the selected past performance measure, such that past performance of the participants with respect to the selected past performance measure can be readily visually compared in connection with a marketplace decision.

Certain embodiments of the present invention may provide one or more technical advantages. Certain embodiments may provide a buyer, supplier, or other electronic marketplace participant with decision support, based on past performance of other such participants, which can help improve its experience with the electronic marketplace and the success of its collaborations, commercial transactions, and other interactions with other such participants through the electronic marketplace. Certain embodiments may allow a participant such as a buyer to readily visually compare the lengths of subdivisions of viewable objects within a display, where each viewable object corresponds to a particular participant such as a supplier and the length of a subdivisions reflects the past performance of the supplier with respect to a measure corresponding to the subdivision. In certain embodiments, past performance may be measured as a function of time required to complete a phase of a transaction cycle having multiple phases, where the length of a subdivision corresponding to the phase reflects the time required to complete the phase. As a result of this comparison, the buyer be better able to determine whether, to what extent, and under what conditions to interact with one or more of particular participants. Furthermore, armed with this decision support, a participant may have increased confidence that its interactions with other participants will in fact meet its needs, based on the past performance of these other participants within the marketplace environment. Certain embodiments may thus improve the efficiency and effectiveness of the interaction between a user and a computer system associated with an electronic marketplace. One or more other technical advantages may be readily apparent to those skilled in the art from the figures, description and claims included herein.

BRIEF DESCRIPTION OF THE DRAWINGS

For a more complete understanding of the present invention and its advantages, reference is now made to the following descriptions, taken in conjunction with the accompanying drawings, in which.

DESCRIPTION OF EXAMPLE EMBODIMENTS

Figure 1:
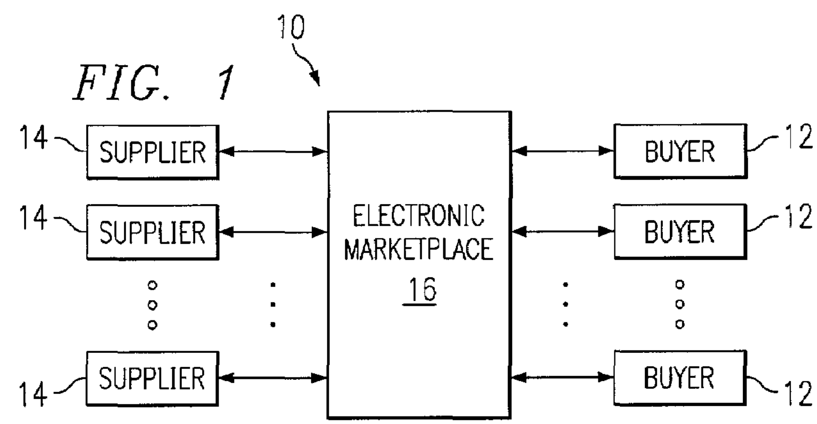
FIG. 1 illustrates an example system providing decision support through visualization of participant past performance in an electronic commerce environment.
Figure 2A:
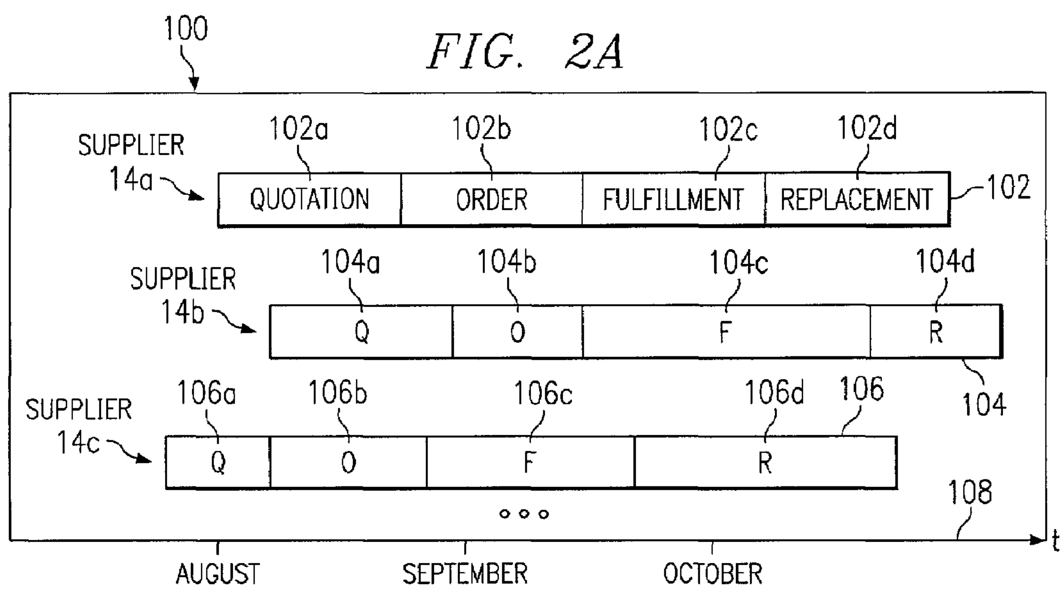
FIG. 2A illustrates an example display providing decision support through visualization of participant past performance in an electronic commerce environment.
Figure 2B:
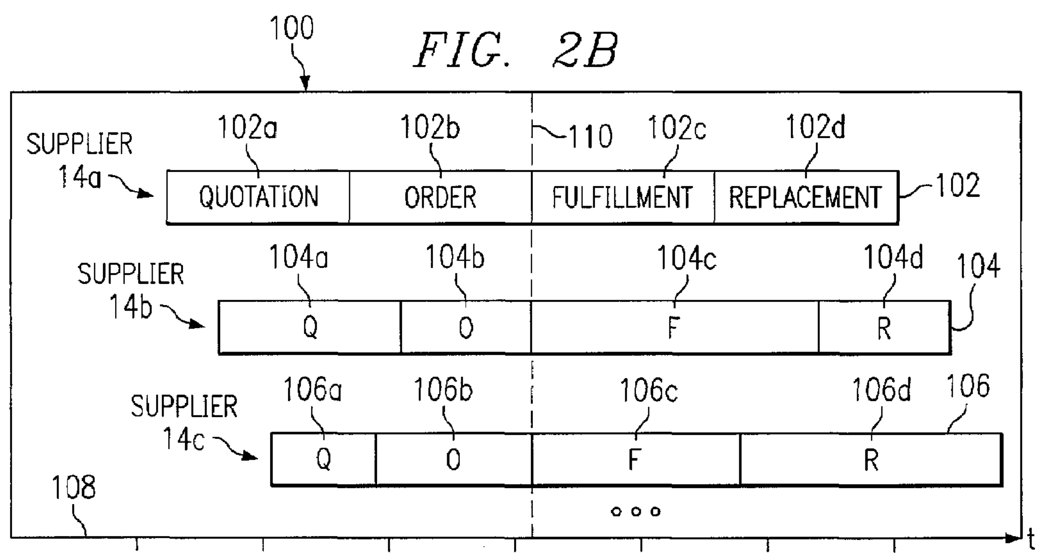
FIG. 2B further illustrates how the example display shown in FIG. 2A can be used by an electronic marketplace participant or other user to visualize and evaluate the past performance of other marketplace participants.

Example embodiments of the present invention and its advantages are best understood by referring to FIGS. 1 through 2B of the drawings, like numerals being used for like and corresponding parts of the various drawings.

FIG. 1 illustrates an example system 10 that can provide decision support through visualization of participant past performance within an electronic commerce environment. System 10 may include buyers 12, suppliers 14, and a business-to-business (B2B), business-to-consumer (B2C), or other electronic marketplace 16 that links buyers 12 to suppliers 14. Electronic marketplace 16 may be associated with one or more websites accessible to buyers 12 and suppliers 14. In general, suppliers 14 make products or other items available to buyers 12 and may collaborate with buyers 12 in one or more ways to establish and maintain appropriate buyer-supplier relationships. Depending on the nature of electronic marketplace 16 and the market it supports, suppliers 14 may include manufacturers, distributors, wholesalers, retailers, or any other entities that supply items to and may collaborate with buyers 12 using electronic marketplace 16.

In general, electronic marketplace 16 receives, compiles, and provides to a participant (i.e. a buyer 12 or supplier 14) information about the past performance of one or more other participants to allow the participant to make better decisions that may improve its experience with electronic marketplace 16 and the success of its collaborations with other participants and executions based on those collaborations. Preferably, in one example embodiment in which decision support is provided to one or more buyers 12, a database (not shown) associated with electronic marketplace 16 can store substantially up-to-date information concerning the past performance of suppliers 14. The past performance information may be supplied by buyers 12 to electronic marketplace 16 based on their collaborations, executions, and any other suitable interactions with suppliers 14 through electronic marketplace 16. Instead or in addition, past performance information may be compiled automatically within the electronic marketplace 16 as interactions occur and certain transaction milestones are reached. Consequently, electronic marketplace 16 can provide substantially up-to-date information about the past performance of suppliers 14 to a buyer 12, which allows buyer 12 to determine whether, to what extent, and under what conditions to collaborate with, purchase from, or otherwise interact with a particular supplier 14. Similarly, electronic marketplace 16 can provide substantially up-to-date information about the past performance of buyers 12 to a supplier 14, which allows supplier 14 to determine whether, to what extent, and under what conditions to collaborate with, sell to, or otherwise interact with a particular buyer 12. Electronic marketplace 16 may receive and compile suitable past performance information concerning marketplace participants in any suitable manner. As described below, electronic marketplace 16 generates a display to provide desired past performance information to a marketplace participant for decision support.

Buyers 12, suppliers 14, and electronic marketplace 16 may each operate on one or more computer systems at one or more locations and may share data storage, communications, or other resources according to particular needs. These computer systems may include appropriate input devices, output devices, mass storage media, processors, memory, or other components for receiving, processing, storing, and communicating information in accordance with operation of system 10. Computer systems referred to herein may each include one or more individual computers at one or more suitable locations. Buyers 12 and suppliers 14 may interact with electronic marketplace 16 autonomously or in accordance with input from one or more users. Buyers 12 and suppliers 14 may be coupled to electronic marketplace 16 using one or more local area networks (LANs), metropolitan area networks (MANs), wide area networks (WANs), a global computer network such as the Internet, or any other suitable wireline, optical, wireless, or other links. Buyers 12, suppliers 14, and electronic marketplace 16 may communicate with each other according to a hub-and-spoke, peer-to-peer, or other suitable architecture. For example, system 10 can be implemented using a hub-and-spoke architecture in which spokes are appropriately integrated with enterprise systems of buyers 12 and suppliers 14 to allow schedule-based data transfer between these enterprise systems and electronic marketplace 16. In a particular embodiment, buyers 12 and suppliers 14 communicate with electronic marketplace 14, at least in part, in the form of Hypertext Markup Language (HTML), Extensible Markup Language (XML), or other files contained in Hypertext Transfer Protocol (HTTP) messages.

FIG. 2A illustrates an example display 100 providing decision support through the visualization of participant past performance in the electronic commerce environment. Display 100 can be generated in any suitable manner for use by any suitable market participant (i.e. buyer 12 or supplier 14) or other user. For example, electronic marketplace 16 can communicate information concerning past performance of suppliers 14 to a computer system associated with a particular buyer 12. Using the past supplier performance information, the computer system can generate display 100 for presentation on a suitable computer monitor for the use of buyer 12. In another embodiment, electronic marketplace 16 can generate display 100 including suitable past supplier performance information and communicate display 100 to a computer system associated with buyer 12 for presentation, for example, in HTML format. In accordance with the present invention, display 100 can enable buyer 12 to readily visualize and compare the past performance of one or more individual suppliers 14 relative to the past performance of one or more other suppliers 14, which facilitates better decision-making by buyer 12. As a result, buyer 12 is better positioned to determine whether, to what extent, and under what conditions to collaborate with, purchase from, or otherwise interact with one or more particular suppliers 14.

Referring to FIG. 2A, display 100 can include a plurality of generally horizontal bars 102, 104, 106, etc. (or other suitable substantially linear objects, such as lines for example). Each bar 102, 104, 106, etc. represents past performance of a supplier 14*a*, 14*b*, 14*c*, etc., respectively, for a particular collaboration, transaction, or other interaction as a function of time (or any other suitable variable). For example, each bar may represent a particular corresponding transaction cycle that includes a sequence of transaction cycle phases. In the illustrated embodiment, the user is associated with a buyer 12 and each bar 102, 104, 106, etc. preferably represents a total duration (i.e. the time elapsed from initiation to completion) for a corresponding purchase transaction cycle conducted between buyer 12 and a supplier 14*a*, 14*b*, 14*c*, etc., respectively. Each bar can represent one transaction cycle involving a single buyer 12 and the supplier 14 corresponding to the bar or an average or any other aggregation of multiple transaction cycles involving one or more buyers 12 and the supplier 14 corresponding to the bar. By visually comparing the lengths (reflecting transaction cycle durations in this example) of bars 102, 104, 106, etc., buyer 12 can readily compare the past performance of suppliers 14*a*, 14*b*, 14*c*, etc., respectively, with respect to the one or more transaction cycles represented. Although bars 102, 104, 106, etc. are illustrated and described as being horizontal, the present invention contemplates bars 102, 104, 106, etc. being vertical or oriented in any other suitable manner consistent with orientation of an associated time (or other suitable variable) axis 108.

For example, assume that the horizontal length of each bar 102, 104, 106, etc. represents how long it took corresponding suppliers 14*a*, 14*b*, 14*c*, etc., respectively, to perform certain tasks in connection with purchases of one or more products. As shown in FIG. 2A, bars 102, 104, 106, etc. can be subdivided into sections or other subdivisions that each represent a phase of a purchase transaction cycle. For example, a purchase transaction cycle may be initiated when a supplier 14 receives a Request for Quotation (RFQ) from a buyer 12 initiating a first "quotation" phase of the cycle (e.g., represented by sections 102*a*, 104*a*, 106*a*, etc.), which can include the time required for a supplier 14 to generate and negotiate a quotation that is deemed acceptable to buyer 12. The quotation phase is terminated when buyer 12 submits an appropriate Purchase Order (PO) based on the quotation. Submission of the PO also initiates a second "order" phase of the cycle (represented by sections 102*b*, 104*b*, 106*b*, etc.), which can include the time required for a supplier 14 to process the PO and reach an agreement with buyer 12 with respect to the deliverables for the PO (e.g., agreement as to quantity of products, price, delivery date, logistics, etc.). The order phase is terminated when a supplier 14 agrees to satisfy the PO and initiates fulfillment of the PO. Initiation of order fulfillment also initiates a third "fulfillment" phase of the cycle (represented by sections 102*c*, 104*c*, 106*c*, etc.), which can include the time required for a supplier 14 to deliver the complete quantity of products as specified in the PO. The fulfillment phase is terminated when the PO is completely fulfilled. A fourth "replacement" phase of the cycle can include the time required for a supplier, following complete fulfillment, to receive and process any returns, repairs, and/or replacements of products (e.g., damaged, blemished, incomplete, etc.) such that buyer 12 considers the cycle to be complete. Although a particular purchase transaction cycle is described by way of example, the present invention contemplates any suitable phases associated with any suitable transaction cycle being represented using sections of bars 102, 104, 106, etc. Thus, in addition to allowing buyer 12 to readily visualize and compare the relative past performance of suppliers 14*a*, 14*b*, 14*c*, etc. for a complete transaction cycle (or a portion of a transaction cycle including multiple phases), display 100 also allows buyer 12 to readily visualize and compare the relative past performance of the suppliers 14 for pertinent individual phases of a transaction cycle.

FIG. 2B further illustrates how the example display 100 in FIG. 2A can be used by a marketplace participant such as buyer 12 to readily visualize and evaluate the past performance of other participants such as suppliers 14*a*, 14*b*, 14*c*, etc.) according to the present invention. As illustrated in FIG. 2B, in response to input from the buyer 12 (e.g., mouse click on a menu item) selecting a particular phase (e.g., the fulfillment phase in this example), a software application associated with electronic marketplace 16 shifts each bar 102, 104, 106, etc. in display 100 horizontally (e.g., left or right) so that the left edges of the appropriate sections (e.g., bar sections 102*c*, 104*c*, 106*c*, etc. in this example) are vertically aligned. A vertical dashed line 110 or another suitable indicator may be added to display 100 to better indicate this alignment and to allow buyer 12 to more readily compare between the suppliers 14. Using display 100, buyer 12 can readily compare the relative lengths of the selected sections 102*c*, 104*c* and 106*c*. In this way, assuming that the length of a section is proportional to the duration of a corresponding phase of the transaction cycle, buyer 12 can substantially immediately obtain from display 100 a comparison of the time it has taken for each supplier 14*a*, 14*b*, 14*c*, etc. to complete the phase for which sections have been aligned (e.g., the fulfillment phase in this example). Again, as mentioned above, each bar 102, 104, 106, etc. can represent one prior transaction or an average or other aggregation of multiple prior transactions. Also as described above, although the bars 102, 104, 106, etc. are illustrated and described as being horizontal, such that sections may be aligned vertically in response to user input, the present invention contemplates bars 102, 104, 106, etc. being vertical or oriented in any other suitable manner consistent with orientation of time (or other appropriate variable) axis 108.

For the example illustrated in FIG. 2B, buyer 12 can readily determine from display 100 that the supplier 14*b* has the shortest fulfillment time of the three suppliers 14*a*, 14*b*, 14*c*, and that supplier 14*c* has the longest fulfillment time of the three, despite the fact that the overall transaction cycle time for supplier 14*b* may be the same as or longer than that for supplier 14*c*. Use and alignment of sections may therefore provide an important decision support tool in certain embodiments. Buyer 12 can use the knowledge gleaned from display 100 in deciding whether, to what extent, and under what conditions to collaborate with, purchase from, or otherwise interact with any or all of suppliers 14*a*, 14*b*, 14*c*. Moreover, by aligning the left edges of the sections corresponding to another phase (e.g., bar sections 102*b*, 104*b*, 106*c* for the order phase) in response to user input selecting the new phase, buyer 12 can view display 100 and determine the relative performance of suppliers 14 as to the new phase. Furthermore, as another example, if buyer 12 is interested in comparing the relative performance of suppliers 14*a*, 14*b*, 14*c* as to the overall transaction cycle, buyer 12 can input an appropriate instruction (e.g., by clicking on a menu item) to cause the left edges of bars 102, 104, 106 to be aligned. The relative lengths of bars 102, 104, 106, representing the duration of the corresponding transaction cycle, can then be compared and evaluated by buyer 12. As is shown in FIG. 2B, where alignment of sections is desired, time axis 108 may indicate a number of elapsed days or other intervals, for example, beginning at the point of alignment, rather than the actual dates on which events actually occurred as in FIG. 2A.

Notably, although the performance of the participants represented by display 100 in FIGS. 2A and 2B can be described in terms of elapsed times, the present invention is not so limited. Instead of lengths of bars 102, 104, 106, etc. representing time intervals, their lengths can represent a mix of variables of interest to a market participant. For example, additional bar sections each representing respective prices for the products involved can be added to bars 102, 104, 106, etc. For example, if buyer 12 is interested in analyzing the relative quality of parts purchased from certain suppliers (e.g., 14*a*, 14*b*, 14*c*), bar sections 102*a*, 104*a*, 106*a* can represent respective prices paid for the parts involved, bar sections 102*b*, 104*b*, 106*b* can represent the time it took for the respective supplier to deliver the parts, bar sections 102*c*, 104*c*, 106*c* can represent the time it took for the parts to be installed, and bar sections 102*d*, 104*d*, 106*d* (not shown) can represent the time it took for the replacement of any defective parts. In other words, in certain embodiments, an important feature of the present invention may be providing a display that allows a market participant to readily visualize and compare the relative performances of other market participants by viewing linear objects (e.g., bars, straight lines, etc.) having at least one dimension sized to represent a value of the parameter or activity of interest. As such, relative sizes of the linear objects indicate the relative performance of the market participants being analyzed.

Although a preferred embodiment of the method and apparatus of the present invention has been illustrated in the accompanying drawings and described in the foregoing description, it will be understood that the invention is not limited to the embodiment disclosed, but is capable of numerous rearrangements, modifications and substitutions without departing from the spirit of the invention as set forth and defined by the following claims.

What is claimed is:

1. A method for providing decision support through the visualization of participant past performance, the method comprising:

retrieving, by a computer associated with an electronic marketplace, stored past performance information for a plurality of participants reflecting performance of the participants in connection with one or more previous transactions conducted using the marketplace, wherein the past performance information for a participant comprises a time to complete each phase of a transaction cycle having a plurality of phases, each phase corresponding to a particular subdivision within each viewable object, the length of a subdivision reflecting the time to complete the phase corresponding to the subdivision;

generating, by the computer, a plurality of substantially linear viewable objects for display to a user, each viewable object corresponding to a particular participant and comprising one or more subdivisions each defined by first and second subdivision boundaries, each subdivision in a viewable object corresponding to a past performance measure and having a length that is proportional to a value of the past performance measure determined according to the retrieved past performance information for the particular participant corresponding to the viewable object;

receiving, by the computer, user input selecting a particular past performance measure; and aligning, by the computer, the first boundaries of the subdivisions corresponding to the selected past performance measure, such that the past performance of the participants with respect to the selected past performance measure can be readily visually compared by the user in connection with a marketplace decision.

2. The method of claim 1, wherein the phases comprise at least one of a quotation phase, an order placement phase, a fulfillment phase, and a replacement phase.

3. The method of claim 1, wherein the selected measure is a selected transaction cycle phase, the first boundaries of the subdivisions aligned to allow the user to readily visually compare the times to complete the selected phase for the participants.

4. The method of claim 1, wherein each viewable object represents an aggregation of multiple transaction cycles involving the corresponding participant.

5. The method of claim 1, wherein the user is associated with a buyer and the past performance information reflects performance of suppliers in connection with previous purchase transactions conducted using the marketplace.

6. The method of claim 1, wherein the viewable objects are horizontally oriented and the first boundaries of the subdivisions are aligned vertically.

7. The method of claim 1, wherein the viewable objects are bars and the subdivisions are sections of the bars.

8. The method of claim 1, wherein the past performance information comprises past performance of at least one procurement activity as a function of price.

9. A system for providing decision support through the visualization of participant past performance, comprising a computer system configured to:

retrieve stored past performance information for a plurality of participants reflecting performance of the participants in connection with one or more previous transactions conducted using the marketplace, wherein the past performance information for a participant comprises a time to complete each phase of a transaction cycle having a plurality of phases, each phase corresponding to a particular subdivision within each viewable object, the length of a subdivision reflecting the time to complete the phase corresponding to the subdivision;

generate a plurality of substantially linear viewable objects for display to a user, each viewable object corresponding to a particular participant and comprising one or more subdivisions each defined by first and second subdivision boundaries, each subdivision in a viewable object corresponding to a past performance measure and having a length that is proportional to a value of the past performance measure determined according to the retrieved past performance information for the particular participant corresponding to the viewable object;

receive user input selecting a particular past performance measure; and align the first boundaries of the subdivisions corresponding to the selected past performance measure, such that the past performance of the participants with respect to the selected past performance measure can be readily visually compared by the user in connection with a marketplace decision.

10. The system of claim 9, wherein the phases comprise at least one of a quotation phase, an order placement phase, a fulfillment phase, and a replacement phase.

11. The system of claim 9, wherein the selected measure is a selected transaction cycle phase, the first boundaries of the subdivisions aligned to allow the user to readily visually compare the times to complete the selected phase for the participants.

12. The system of claim 9, wherein each viewable object represents an aggregation of multiple transaction cycles involving the corresponding participant.

13. The system of claim 9, wherein the user is associated with a buyer and the past performance information reflects performance of suppliers in connection with previous purchase transactions conducted using the marketplace.

14. The system of claim 9, wherein the viewable objects are horizontally oriented and the first boundaries of the subdivisions are aligned vertically.

15. The system of claim 9, wherein the viewable objects are bars and the subdivisions are sections of the bars.

16. The system of claim 9, wherein the past performance information comprises past performance of at least one procurement activity as a function of price.

17. Software for providing decision support through the visualization of participant past performance, the software embodied in computer-readable media and when executed by a computer system is configured to:

retrieve stored past performance information for a plurality of participants reflecting performance of the participants in connection with one or more previous transactions conducted using the marketplace, wherein the past performance information for a participant comprises a time to complete each phase of a transaction cycle having a plurality of phases, each phase corresponding to a particular subdivision within each viewable object, the length of a subdivision reflecting the time to complete the phase corresponding to the subdivision;

generate a plurality of substantially linear viewable objects for display to a user, each viewable object corresponding to a particular participant and comprising one or more subdivisions each defined by first and second subdivision boundaries, each subdivision in a viewable object corresponding to a past performance measure and having a length that is proportional to a value of the past performance measure determined according to the retrieved past performance information for the particular participant corresponding to the viewable object;

receive user input selecting a particular past performance measure; and align the first boundaries of the subdivisions corresponding to the selected past performance measure, such that the past performance of the participants with respect to the selected past performance measure can be readily visually compared by the user in connection with a marketplace decision.

18. The software of claim 17, wherein the phases comprise at least one of a quotation phase, an order placement phase, a fulfillment phase, and a replacement phase.

19. The software of claim 17, wherein the selected measure is a selected transaction cycle phase, the first boundaries of the subdivisions aligned to allow the user to readily visually compare the times to complete the selected phase for the participants.

20. The software of claim 17, wherein each viewable object represents an aggregation of transaction cycles involving the corresponding participant.

21. The software of claim 17, wherein the user is associated with a buyer and the past performance information reflects performance of suppliers in connection with previous purchase transactions conducted using the marketplace.

22. The software of claim 17, wherein viewable objects are horizontally oriented and the first boundaries of the subdivisions are aligned vertically.

23. The software of claim 17, wherein the viewable objects are bars and the subdivisions are sections of the bars.

24. The software of claim 17, wherein the past performance information comprises past performance of at least one procurement activity as a function of price.

25. A system for providing decision support through the visualization of participant past performance, comprising:

means for retrieving stored past performance information for a plurality of participants reflecting performance of the participants in connection with one or more previous transactions conducted using the marketplace, wherein the past performance information for a participant comprises a time to complete each phase of a transaction cycle having a plurality of phases, each phase corresponding to a particular subdivision within each viewable object, the length of a subdivision reflecting the time to complete the phase corresponding to the subdivision;

means for generating a plurality of substantially linear viewable objects for display to a user, each viewable object corresponding to a particular participant and comprising one or more subdivisions each defined by first and second subdivision boundaries, each subdivision in a viewable object corresponding to a past performance measure and having a length that is proportional to a value of the past performance measure determined according to the retrieved past performance information for the particular participant corresponding to the viewable object;

means for receiving user input selecting a particular past performance measure; and means for aligning the first boundaries of the subdivisions corresponding to the selected past performance measure, such that the past performance of the participants with respect to the selected past performance measure can be readily visually compared by the user in connection with a marketplace decision.

26. A method for providing decision support to a user associated with a buyer through visualization of past supplier performance, the method comprising:

retrieving, by a computer associated with an electronic marketplace, stored past performance information for a plurality of suppliers reflecting performance of the suppliers in connection with one or more previous transactions conducted using the marketplace, the past performance information for each supplier comprising start and end times for each of a plurality of transaction cycle phases involving the supplier, the start and end times for a phase defining a duration of the phase, a transaction cycle comprising a sequence of phases whose durations collectively define a duration of the transaction cycle;

generating, by the computer, a plurality of substantially linear viewable objects for display to a user associated with a buyer, each viewable object corresponding to a particular supplier and representing one or more transaction cycles involving the corresponding supplier, each viewable object comprising one or more subdivisions each defined by first and second subdivision boundaries that together indicate the duration of a phase corresponding to the subdivision, each subdivision in a viewable object having a length proportional to the duration of the phase corresponding to the subdivision and determined according to the retrieved past performance information for the particular supplier corresponding to the viewable object, the viewable objects being oriented such that each subdivision boundary corresponds to a time along a horizontal time axis;

receiving, by the computer, user input selecting a particular phase; and aligning, by the computer, with respect to the time axis the first boundaries of the subdivisions corresponding to the selected phase, such that the durations of the selected phase for the suppliers corresponding to the viewable objects can be readily visually compared by the user in connection with a marketplace decision.

* * * * *

UNITED STATES PATENT AND TRADEMARK OFFICE
CERTIFICATE OF CORRECTION

PATENT NO. : 7,620,566 B2
APPLICATION NO. : 09/978926
DATED : November 17, 2009
INVENTOR(S) : Manoel Tenorio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2735 days.

Signed and Sealed this

Twenty-sixth Day of October, 2010

David J. Kappos
*Director of the United States Patent and Trademark Office*